US012016311B2

(12) United States Patent
Deraps et al.

(10) Patent No.: US 12,016,311 B2
(45) Date of Patent: Jun. 25, 2024

(54) PET TREAT AND TOY DISTRIBUTOR

(71) Applicant: Be One Breed, Beloeil (CA)

(72) Inventors: Anthony Deraps, Beloeil (CA); Mario Primeau, Montreal (CA)

(73) Assignee: Be One Breed, Beloeil (CA)

( * ) Notice: Subject to any disclaimer, the term of this patent is extended or adjusted under 35 U.S.C. 154(b) by 168 days.

(21) Appl. No.: 17/708,587

(22) Filed: Mar. 30, 2022

(65) Prior Publication Data

US 2022/0312725 A1    Oct. 6, 2022

Related U.S. Application Data

(60) Provisional application No. 63/167,740, filed on Mar. 30, 2021.

(51) Int. Cl.
*A01K 5/01* (2006.01)
*A01K 5/02* (2006.01)

(52) U.S. Cl.
CPC .......... *A01K 5/0114* (2013.01); *A01K 5/0275* (2013.01); *A01K 5/0291* (2013.01)

(58) Field of Classification Search
CPC ...... A01K 5/0114; A01K 5/0142; A01K 5/02; A01K 5/0225; A01K 5/0275; A01K 5/0291; A01K 15/025
USPC ........................................................ 119/707
See application file for complete search history.

(56) References Cited

U.S. PATENT DOCUMENTS

| | | | | |
|---|---|---|---|---|
| 4,450,790 A | * | 5/1984 | Stansbury, Jr. ...... | A01K 5/0291 119/51.5 |
| 4,671,210 A | * | 6/1987 | Robinson ............. | A01K 5/0291 119/51.12 |
| 5,377,620 A | * | 1/1995 | Phillippi .............. | A01K 5/0291 119/51.12 |
| 6,427,628 B1 | * | 8/2002 | Reece .................. | A01K 5/0291 119/51.11 |
| 6,701,866 B1 | * | 3/2004 | Shieh ................... | A01K 5/0291 119/51.5 |
| 8,424,489 B2 | * | 4/2013 | Desrosiers ........... | A01K 5/0114 119/61.5 |
| 9,675,049 B2 | * | 6/2017 | Cheng .................. | A01K 5/02 |

(Continued)

FOREIGN PATENT DOCUMENTS

GB          2541012 A   *   2/2017   ........... A01K 5/0114

*Primary Examiner* — Tien Q Dinh
*Assistant Examiner* — Erica Michelle Huebner
(74) *Attorney, Agent, or Firm* — Benoit & Cote Inc.; Charles-Andre Caron; Mathieu Audet

(57) ABSTRACT

A distributor to distribute a treat among toys and food treats to a pet is described. The distributor comprises a base assembly; a carousel pivotably mounted to the base assembly, the carousel comprising partitions defining at least a first compartment; a cap configured to be mounted to the base and to cover the carousel, the cap comprising an opening that, when aligned with the first compartment, provides access to the first compartment; and driving means for driving the carousel to rotate between a first orientation wherein the first compartment is hidden and a second orientation wherein the first compartment is aligned with the opening, wherein a treat located in the compartment becomes accessible to the pet. The distributor may comprise a food dispenser releasably coupled to a feeder motor, and drivable only when the carousel is in a feeding orientation.

20 Claims, 9 Drawing Sheets

(56) References Cited

U.S. PATENT DOCUMENTS

| | | | |
|---|---|---|---|
| 2005/0066905 A1* | 3/2005 | Morosin | A01K 5/0291 |
| | | | 119/51.02 |
| 2008/0289580 A1* | 11/2008 | Krishnamurthy | A01K 5/0291 |
| | | | 119/51.11 |
| 2014/0090601 A1* | 4/2014 | Stone | A01K 5/0275 |
| | | | 119/51.01 |
| 2015/0332536 A1* | 11/2015 | Dial, III | G07F 7/08 |
| | | | 221/13 |

* cited by examiner

PET TREAT AND TOY DISTRIBUTOR

CROSS-REFERENCE TO RELATED APPLICATION

This application claims priority from U.S. provisional patent application 63/167,740 filed Mar. 30, 2021, the specification of which is hereby incorporated herein by reference in its entirety.

BACKGROUND

(a) Field

The subject matter disclosed generally relates to systems dispensing treats and toys to a pet. More particularly, the subject matter disclosed relates to web-connected systems for remotely dispensing treats and toys.

(b) Related Prior Art

In existing systems to distribute treats to a pet, the distribution of toys is not performed. The pet owner must thus leave all the toys accessible for the pet, reducing the excitation of the pet to play and therefore limiting the play phase to a small part of the day when its owner is not there.

Existing treat distributors generally allow the pet owner to choose to distribute remotely a treat using internet or a phone app. This can be disruptive for the pet already in loss of landmarks due to his owner's absence.

There is therefore a need for improved systems to distribute treats and toys to a pet.

SUMMARY

In some aspects, the techniques described herein relate to a distributor to distribute a treat among toys and food treats to a pet, the distributor including: a base assembly; a carousel pivotably mounted to the base assembly, the carousel including partitions defining at least a first compartment; a cap configured to be mounted to the base and to cover the carousel, the cap including an opening that, when aligned with the first compartment, provides access to the first compartment; and driving means for driving the carousel to rotate between a first orientation wherein the first compartment is not aligned with the opening, and a second orientation wherein the first compartment is aligned with the opening, wherein in the second orientation the treat is accessible to the pet.

In some aspects, the techniques described herein relate to a distributor, wherein the driving means is a motor housed in the base assembly.

In some aspects, the techniques described herein relate to a distributor, further including a cap driving assembly coupling the driving means to the cap.

In some aspects, the techniques described herein relate to a distributor, wherein the driving assembly includes a rotation base pivotally mounted to the base assembly, the rotation base including a cap driving interface configured to be coupled to the cap.

In some aspects, the techniques described herein relate to a distributor, wherein the cap driving interface includes a least one groove.

In some aspects, the techniques described herein relate to a distributor, wherein the cap driving interface is configured to rotate about an axis, and wherein the at least one groove is unevenly distributed around the axis.

In some aspects, the techniques described herein relate to a distributor, further including a food dispenser configured to be mounted to the first compartment and a feeder motor configured to drive the food dispenser.

In some aspects, the techniques described herein relate to a distributor, wherein the compartment includes a slope portion extending between an elevated portion and a trough portion, wherein the food dispenser is configured to be mounted to the elevated portion and to extend beyond the elevated portion above the slope portion.

In some aspects, the techniques described herein relate to a distributor, wherein the elevated portion includes an aperture, and the food dispenser includes a shaft configured to extend through the aperture when mounted to the first compartment.

In some aspects, the techniques described herein relate to a distributor, further including a feeder driving assembly coupled to the feeder motor, wherein the shaft is configured to be coupled releasably to the feeder driving assembly.

In some aspects, the techniques described herein relate to a distributor, wherein the feeder driving assembly and the shaft are coupled along a feeder driving interface, the feeder driving interface including a tenon and a grove.

In some aspects, the techniques described herein relate to a distributor, wherein feeder driving interface is shaped to dismount the shaft from the feeder driving assembly when the carousel rotates.

In some aspects, the techniques described herein relate to a distributor, wherein the food dispenser includes a food container controllably coupled to a distribution room, and wherein driving the shaft in a filling position aligns the food container with the distribution room.

In some aspects, the techniques described herein relate to a distributor, wherein the distribution room is distal from the shaft, and wherein driving the shaft in a distributing position sets the distribution room above one of the slope portion and the trough portion.

In some aspects, the techniques described herein relate to a distributor, further including a Printed Control Board coupled to the driving means, the Printed Control Board being configured to control operation of the driving means.

In some aspects, the techniques described herein relate to a distributor, further including a screen and at least one control button coupled to the Printed Control Board, wherein the base assembly includes base apertures providing access to the screen and the at least one control button.

In some aspects, the techniques described herein relate to a distributor, wherein the cap includes a cap aperture and a cover portion, wherein the cap aperture provides access to the screen and the cover portion prevent access to the at least one control button when the cap is mounted to the base assembly.

In some aspects, the techniques described herein relate to a distributor, wherein the carousel includes a skate assembly, and the distributor includes a sensor coupled to the Printed Control Board, wherein the sensor is configured to detect the skate assembly when traveling in proximity thereof.

In some aspects, the techniques described herein relate to a distributor, further including at least a second compartment, wherein rotation of the carousel in the first orientation results in the second compartment being aligned with the opening.

In some aspects, the techniques described herein relate to a distributor, wherein the base assembly and the cap have a non-cylindrical interface through which the cap is mounted to the base assembly, the non-cylindrical interface preventing rotation of the cap relative to the base assembly.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
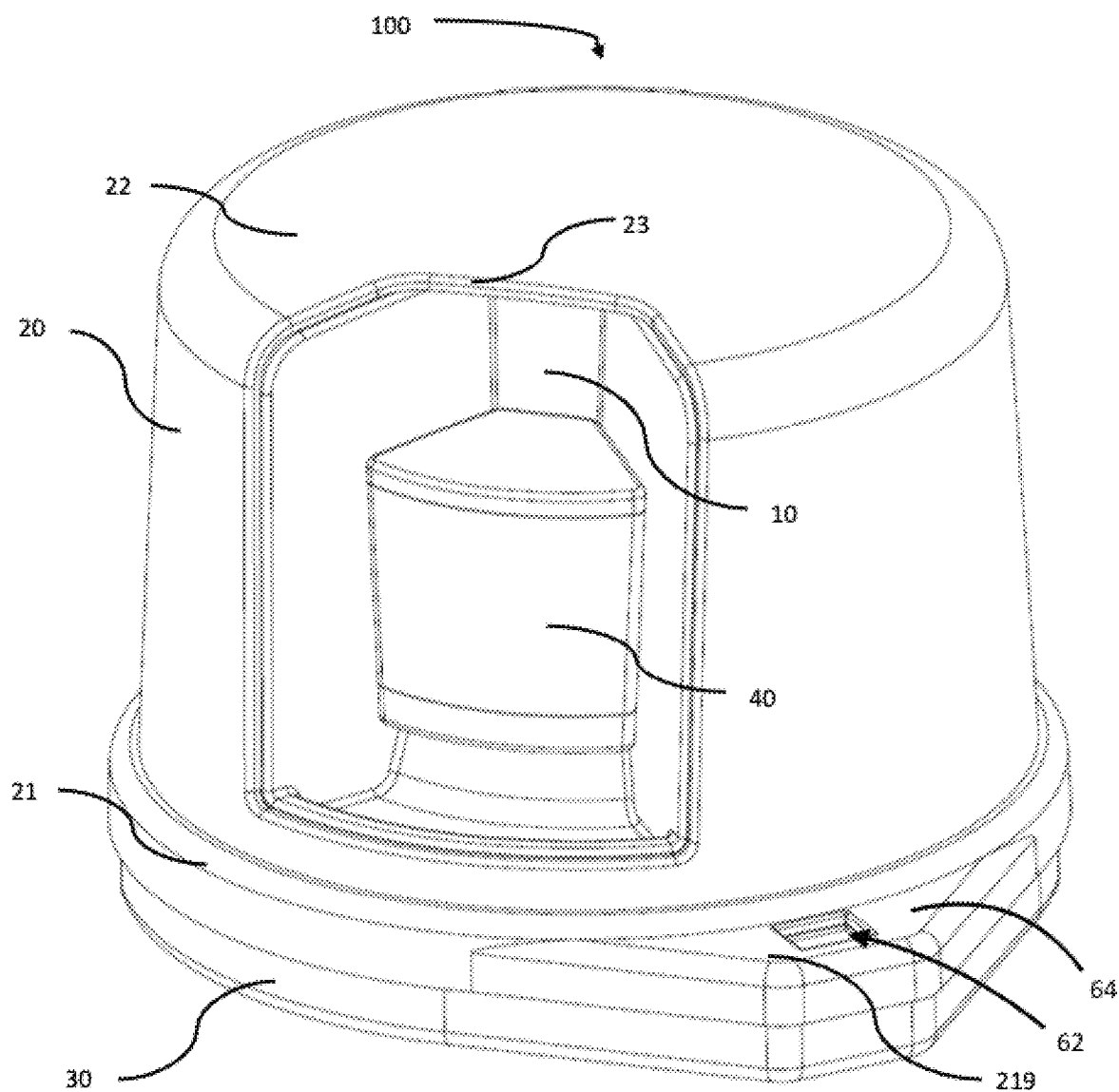
FIG. 1 is a perspective view of the pet treat and toy dispenser, with a cap, in accordance with an embodiment.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal usage of the device being described.

The term "floor" means a flat surface in the room where the system in installed.

Referring now to the drawings, and more particularly to FIGS. 1, 2 and 7A-B, a pet treat and toy distributor 100 is adapted to dispense treats, namely food treats and toys, to a pet, e.g., a cat or a dog. As shown of FIG. 1, the pet treat and toy distributor 100 comprises a carousel 10 that comprises compartments 11. The pet treat and toy distributor 100 further comprises a base assembly 30 with the carousel 10 pivotably mounted thereto about axis 55 (see FIGS. 3 and 4). A cap 20, fixed on the base assembly 30, covers the carousel 10.

Figure 2:
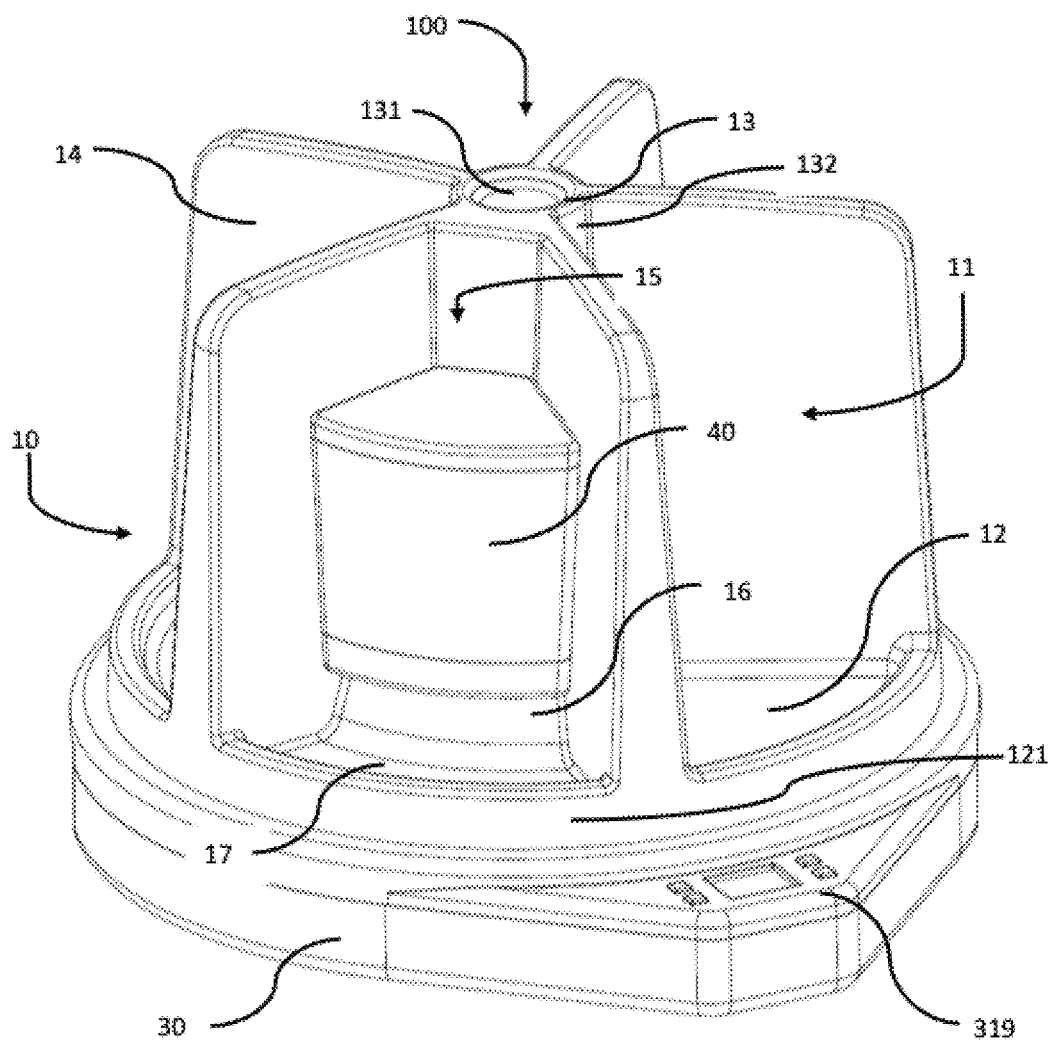
FIG. 2 is a perspective view of the pet treat and toy dispenser shown in FIG. 1, without the cap thereby showing different compartments configured to hold treats.
Figure 3:
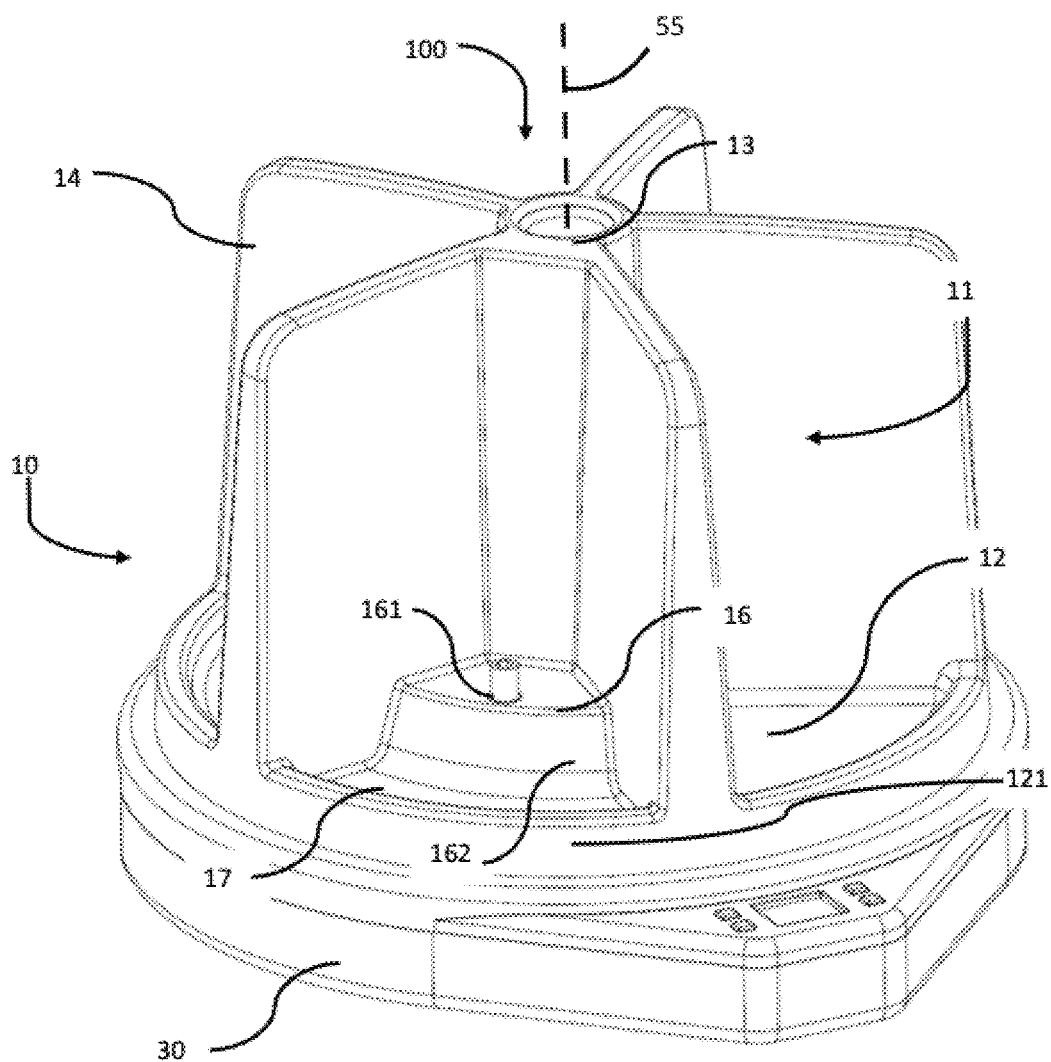
FIG. 3 is a perspective view of the pet treat and toy dispenser shown in FIG. 1, without the cap and the food dispenser else its shaft.
Figure 6:
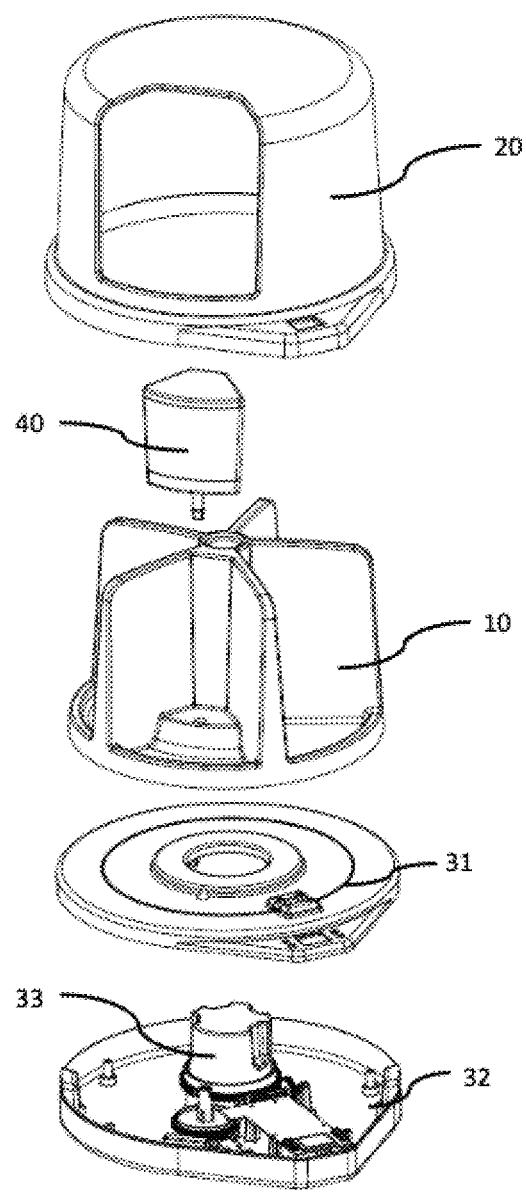
FIG. 6 is an exploded view of the pet treat and toy dispenser shown in FIG. 1.

According to an embodiment and as shown on FIGS. 3 and 6, the carousel 10 comprises a carousel disk 12 with a border 121, on which the cap 20 will be placed. The carousel 10 further comprises a carousel tube 13 in the center of the carousel disk 12. The axis of the carousel tube 13 is coaxial with the axis of carousel disk 12. As shown on FIG. 2, the carousel tube 13 has an interior surface 131 and an exterior surface 132.

Returning to FIG. 3, the carousel 10 further comprises vertical partitions 14 that define the compartments 11 in-between. These vertical partitions 14 extend radially from the exterior surface 132 of the carousel tube 13 on the carousel disk 12. Preferably, the carousel 10 therefore comprises as many vertical partitions 14 as compartments 11.

According to an embodiment, the number of compartments 11 comprised in the carousel 10 may vary.

According to an embodiment and as shown on FIGS. 2, 3 and 6, only one compartment 11, the food compartment 15, is used to distribute food treats to the pet. The other compartments 11 are made to contain a toy (not shown). The food compartment 15 further comprises an elevated portion 16 in the portion closest to the axis 55 of the food compartment 15, extending from the carousel disk 12 and the two vertical walls which delimit the food compartment 15.

The elevated portion 16 comprises a vertical cylindrical aperture 161 and extends radially to a slope portion 162. Since the elevated portion 16 does not cover the entire section of the carousel disk 12 of the food compartment 15, the remaining share of the section of the carousel disk 12 beyond the slope portion 162 creates a trough portion 17 collecting the food treat and configured for the pet to eat therefrom. The goal of the elevated portion 16 is to allow a food dispenser 40 to be installed thereon at a given height.

Figure 4:
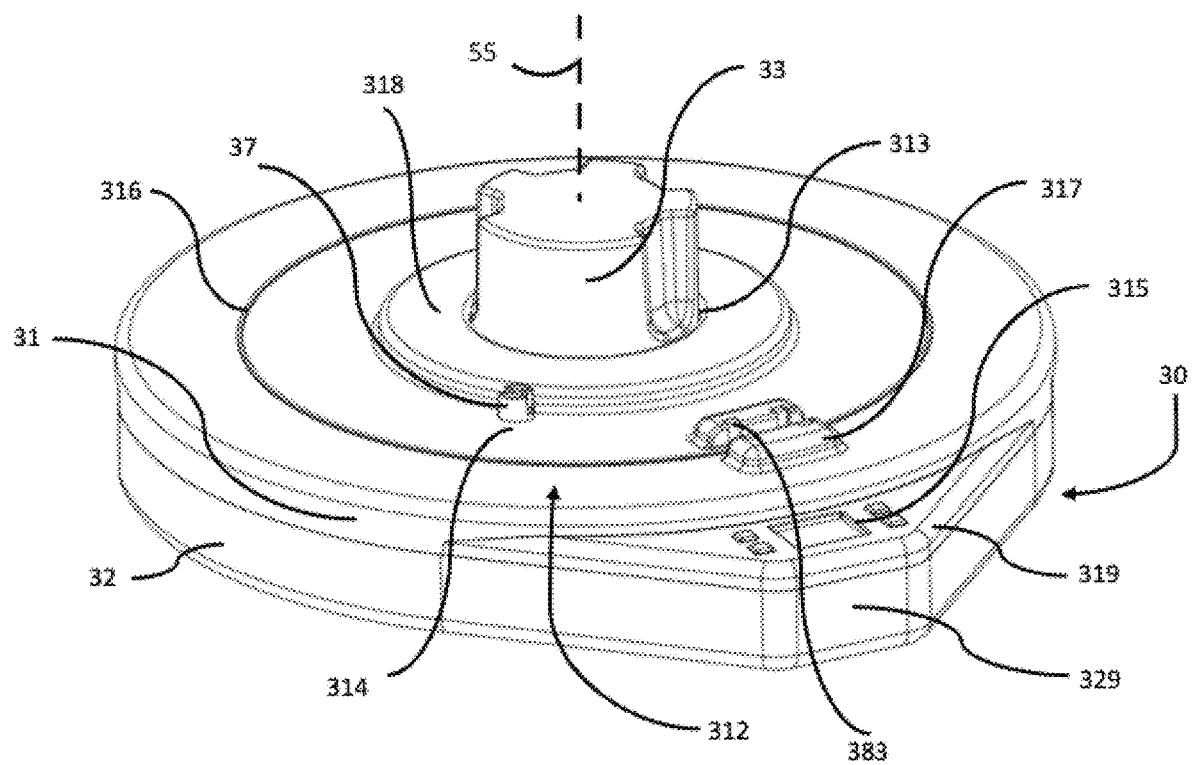
FIG. 4 is a perspective view of the base assembly of the pet treat and toy dispenser shown in FIG. 1.
Figure 5:
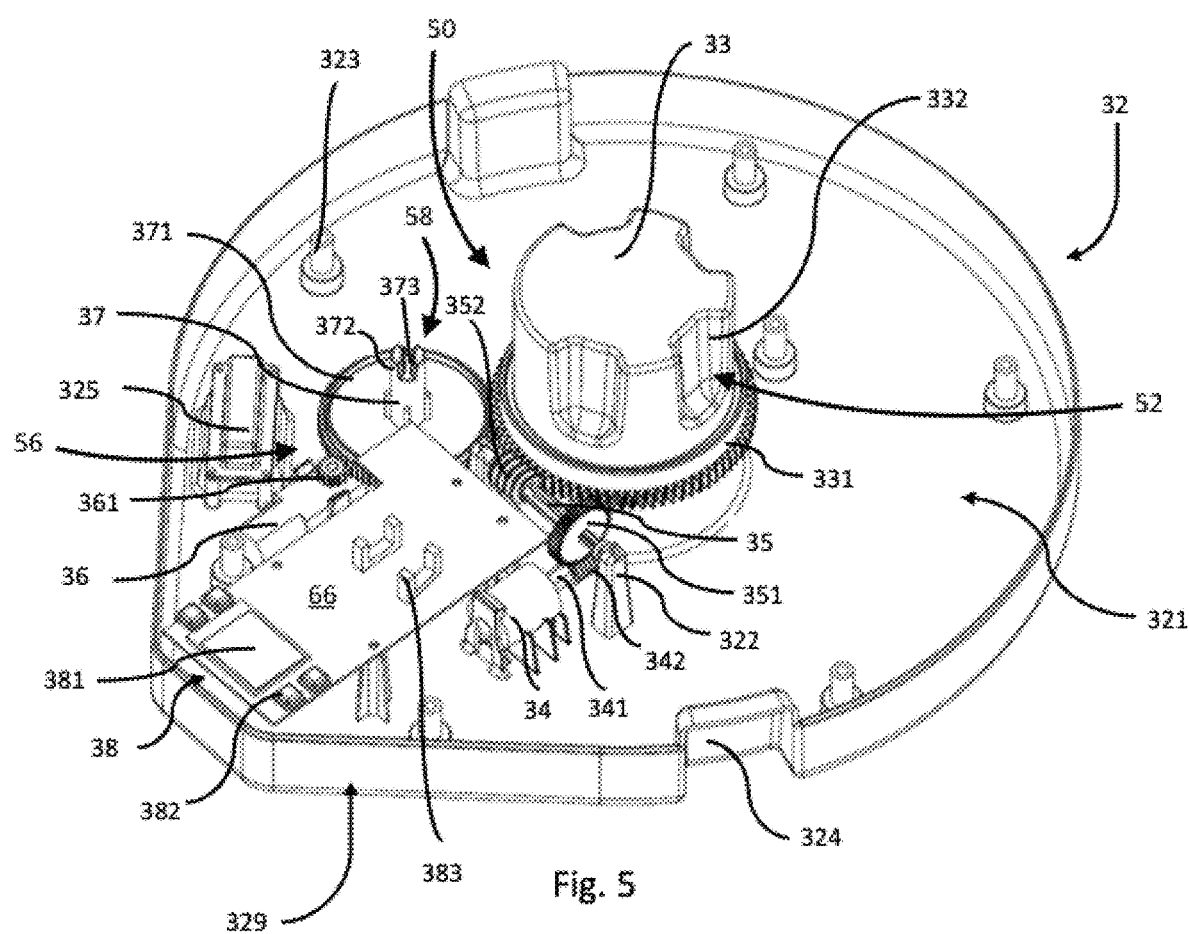
FIG. 5 a perspective view of the bottom base of the base assembly of FIG. 4.

Now referring to FIGS. 4 and 5, the base assembly 30 comprises a top base 31 and a bottom base 32. Both of the top base 31 and bottom base 32 have a substantially cylindrical shape, where a quarter of the cylindrical shape features a protrusion having a rectangular shape. This part of the base assembly 30 is called the top interface part 319 for the top base 31 and the bottom interface part 329 on the bottom base 32.

As shown on FIGS. 4 and 5, the base assembly 30 is hollow and relatively thin. The bottom base 32 has an inner surface 321 and an outer surface (not shown). Similarly, the top base 31 has an inner surface (not shown) and an outer surface 312. Bottom fixations 323 are fixed at different locations on the inner surface 321 of the bottom base 32. Each of these bottom fixations 323 are configured to attach to corresponding top fixations (not shown) on the inner surface of the top base 31, to join both parts of the base assembly 30 and to better support the weight exerted on the top base 31. To secure the base assembly 30, the top base 31 clips on the edges of the bottom base 32. The bottom base 32 further comprises handles 324 embodied as recesses that provide means for the pet treat and toy distributor 100 to be displaced easily.

As shown on FIG. 5, a rotation base 33 is located at the center of the cylindrical shape of the bottom base 32. The rotation base 33 has a cylindrical shape and is pivotally driven by parts of the bottom base 32 (as described below) via an externally toothed mechanical crown 331 that extends from the rotation base 33. As shown on FIGS. 4, 5 and 6, the cap driving assembly 50 of the rotation base 33 comprises a cap driving interface 52 featuring grooves 332, more precisely unevenly distributed grooves 332, on its top portion configured to interface and drive the carousel 10.

Driving means embodied as a rotation motor 34, namely an electric motor, is mounted on the bottom base 32. Referring to FIG. 5, there is shown the rotation motor 34 which drives a driving axle 341 comprising a driving worm 342 distant from the rotation motor 34. The bottom base 32 comprises a pair of axle supports 322, protruding from the inner surface 321, supporting both ends of a main axle 35 and creating a pivot linkage with the main axle 35. The main axle 35 comprises a main worm wheel 351 at one end of the main axle 35 that is drivingly connected to the driving worm 342. The main axle 35 comprises a main worm 352 at the other end that is drivingly connected to the mechanical crown 331 of the rotation base 33. Therefore, when the rotation motor 34 rotates, the driving worm 342 engages the main worm wheel 351 which causes the main axle 35 to rotate. Then, the main worm 352 engages the mechanical crown 331 and causes the rotation base 33 to rotate, and hence drives the carousel 10 when installed.

According to another embodiment (not shown), the rotation motor 34 comprises a driving axle having a driving worm that is directly coupled to the mechanical crown 331 of the rotation base 33.

According to an embodiment, as depicted on FIG. 5, a feeder motor 36 is also mounted to the bottom base 32. The feeder motor 36 is coupled to a feeder driving assembly 56 that comprises a feeder driving gear 361. A feeder transmission shaft 37 comprises a transmission gear 371 that is engaged with the feeder driving gear 361. When the feeder motor 36 rotates, the linked feeder driving gear 361 causes the feeder transmission shaft 37 to rotate via the transmission gear 371. The upper end 372 of the feeder transmission shaft 37, at the feeder driving interface 58, has a cylindrical shape, with at its extremity a horizontal groove 373.

The bottom base 32 further features an electronic interface 38 that comprises a screen 381 and buttons 382 coupled to a Printed Control Board (PCB) 66, and fixed in the bottom interface part 329. The electronic interface 38 allows the user to set up the feeder motor 36 and the rotation motor 34. For example, the set up allows to program the carousel 10 to set when the feeder motor 36 and the rotation motor 34 will rotate and the length (e.g., number of degrees, number of cycles) of the rotation. Position sensors 383 are mounted to the bottom base 32 through the PCB 66, allowing position sensors 383 to be powered and to communicate with the PCB 66.

As shown on FIGS. 4 and 6, the top base 31 comprises a central aperture 313 that allows passage of the rotation base 33. A feeder shaft aperture 314, present on the top base 31, allows passage to the upper end 372 of the feeder transmission shaft 37. Interface apertures 315 in the top interface part 319 allow the electronic interface 38 mounted on the bottom base 32 to be accessible through the top base 31. The top base 31 further comprises a cylindrical surface elevation 318 on its outer surface 312. The top base 31 further comprises an annular rib 316 that separates its outer surface 312 into two disk surfaces. According to an embodiment, the top base 31 further comprises a pair of sensor supports 317 to house the position sensors 383.

As shown on FIGS. 2, 3 and 6, the carousel 10 is mounted to the rotation base 33. The interior surface 131 of the carousel tube 13 comprises surface elevations (not shown) that enter the grooves 332 and thus ensure proper engagement between the rotation base 33 and the carousel 10. As shown on FIG. 5, the grooves 332 are not uniformly distributed on the rotation base 33. This uneven distribution of the grooves 332 forces a particular orientation of the carousel 10 relative to the rotation base 33, and thus ensuring proper location of the food compartment 15 relative to the position sensors 383.

Referring additionally to FIG. 4, the carousel 10 when installed on the base assembly 30 is also in contact with the outer surface 312 of the top base 31. According to an embodiment, the bottom surface of the carousel disk 12 fits the outer surface 312 of the top base 31. The cylindrical surface elevation 318 of the top base 31 prevents any radial translation of the carousel with respect to the top base 31, thereby facilitating the installation of the carousel 10.

Figures 8A, 8B:
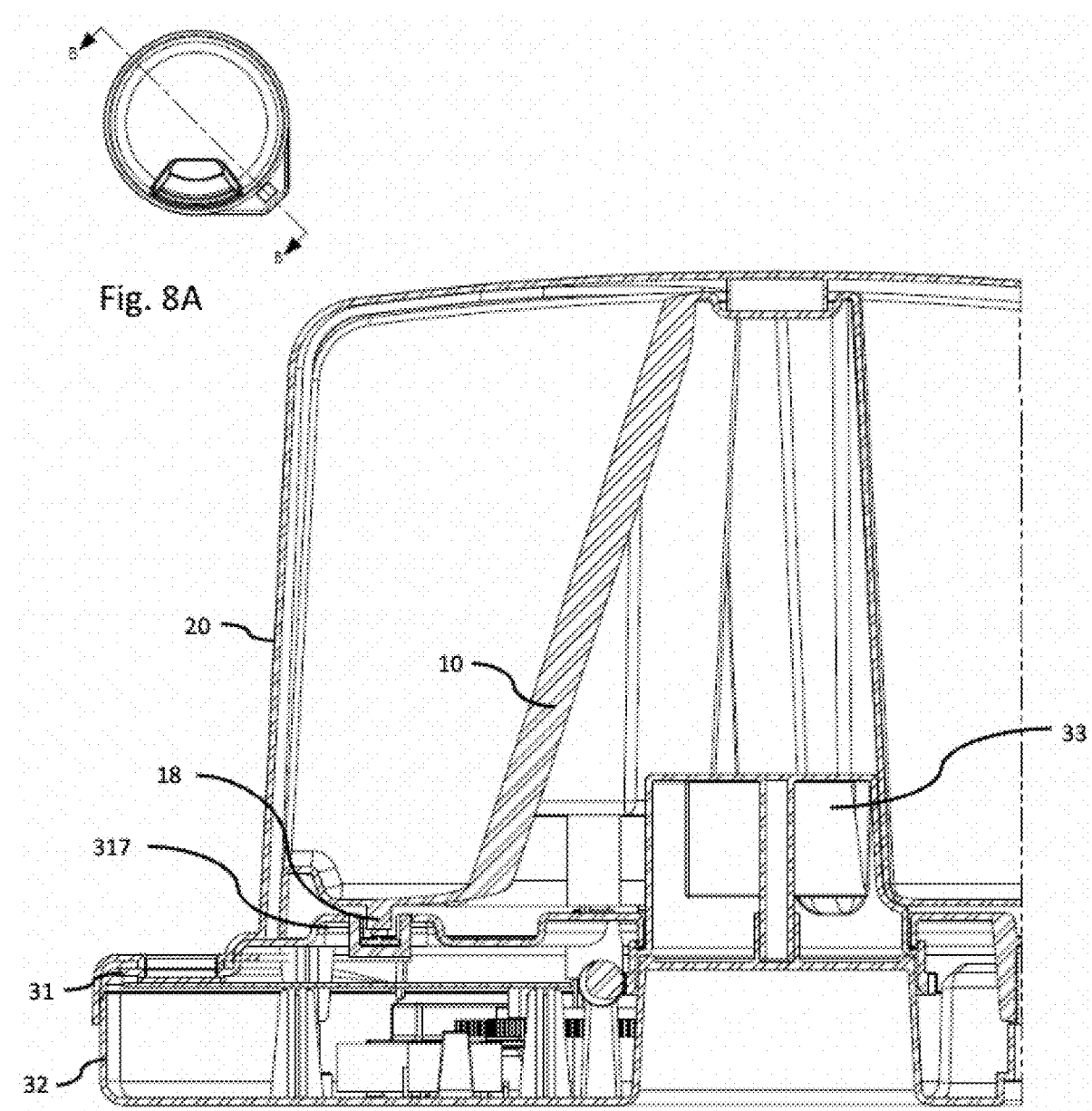
FIGS. 8A and 8B are respectively an elevation view of the pet treat and toy dispenser shown in FIG. 1, and a cross-section view according to cross-section lines 8B-8B.

Referring to FIGS. 8A-B, the carousel 10 further comprises a skate assembly 18 that, when placed on the bottom surface of the carousel disk 12, is configured to travel on the annular rib 316 and to travel between the position sensors 383 when the carousel 10 rotates.

According to an embodiment, there can be more than one skate assembly 18. According to an embodiment, another part can be detected by the position sensors 383, or alternative methods of detection (magnetic, optic, etc.) may be used to detect the orientation of the carousel 10.

In all cases, the position sensors 383 are used to determine which one of the compartments 11 is positioned in front of the cap opening 23. For instance, this can be done by determining the "home position" (e.g., the position in which the food compartment 15 in front of the cap opening 23) and then counting the number of compartments 11 (e.g., the number of associated "sensed parts") that pass by the position sensors 383 either direction.

It is worth mentioning that the vertical cylindrical aperture 161 and the feeder shaft aperture 314 are at an equal distance to the axis 55. This ensures that, when the carousel 10 is appropriately oriented, the vertical cylindrical aperture 161 and the feeder shaft aperture 314 are coaxial.

According to an embodiment and as depicted on FIGS. 1 and 6, the cap 20 comprises a cap base 21 and a covering portion 22. The cap base 21 has a shape similar to the top base 31 and the bottom base 32, comprising an overall hollow cylindrical shape. As for the top base 31 and bottom base 32, the cap base 21 also comprises an interface part, called the cap interface part 219. As shown on FIG. 1, a cap aperture 62 is present on the cap interface part 219, allowing the user to see the screen 381 through the cap 20 and a cover portion 64 protecting the buttons against the pet pushing on a button. The covering portion 22 has an overall shape of a hollow capped frustum. The covering portion 22 of the cap 20 comprises a single cap opening 23. The dimension of this cap opening 23 is configured to correspond to the dimension of the compartments 11 of the carousel 10. Therethrough, the carousel 10 is configured for only one compartment 11 being accessible at a time.

According to an embodiment, the cap 20 is laid on the top base 31, allowing the owner to remove it easily and to refill efficiently each compartment 11 in food or toys.

According to an embodiment, the cap 20 is at least partially transparent, allowing to verify content of every compartment 11 of the carousel 10 without removing the cap 20.

According to an embodiment, the cap opening 23 of the cap 20 is configured so that the center of the cap opening 23 and the feeder transmission shaft 37 are aligned.

As shown in FIGS. 1, 7A-B and 9, the food dispenser 40 comprises a food container 41, a container cap 43 and a container support 44. The bottom part of the food container 41 comprises an aperture 411 to dispense the food treats. The bottom part of the food container 41 has a funnel-shape 412 that facilitates the evacuation of the food through the aperture 411 and that prevents the food from getting stuck in the food container 41. The container cap 43 is configured to clip on the top part of the food container 41. The container support 44 is configured to clip on the bottom part of the food container 41. The container support 44 comprises a rotation aperture 441 and a distributing aperture 442. As shown on FIGS. 1 and 7A-B, the container support 44 is configured to be placed on the elevated portion 16 with the distributing aperture 442 being located beyond the top edge of the slope portion 162 thereby having the food treats freed from the food dispenser 40 falling down into the trough portion 17.

Figures 7A, 7B:
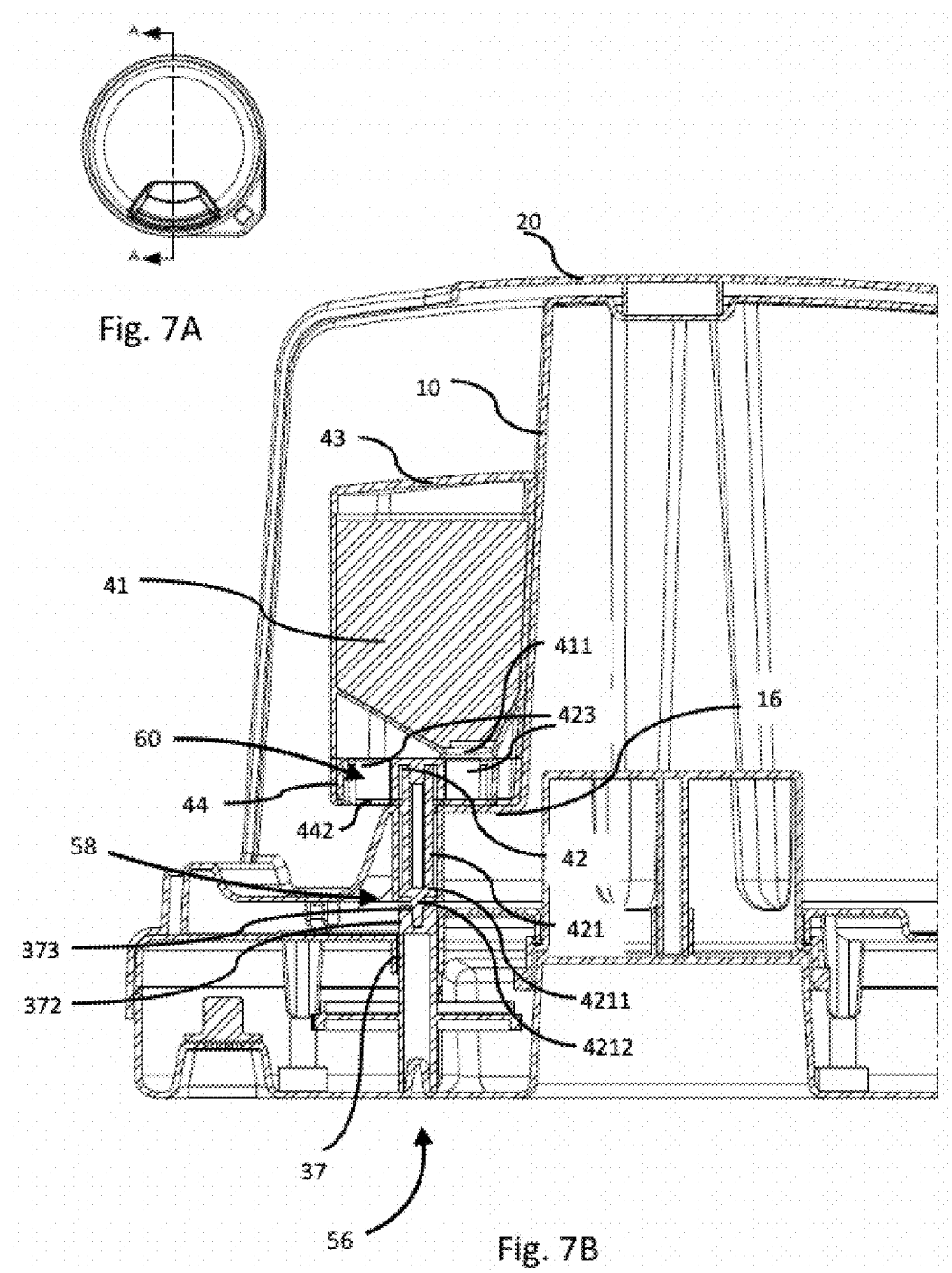
FIGS. 7A and 7B are respectively an elevation view of the pet treat and toy dispenser shown in FIG. 1, and a cross-section view according to cross-section lines 7B-7B.
Figure 9:
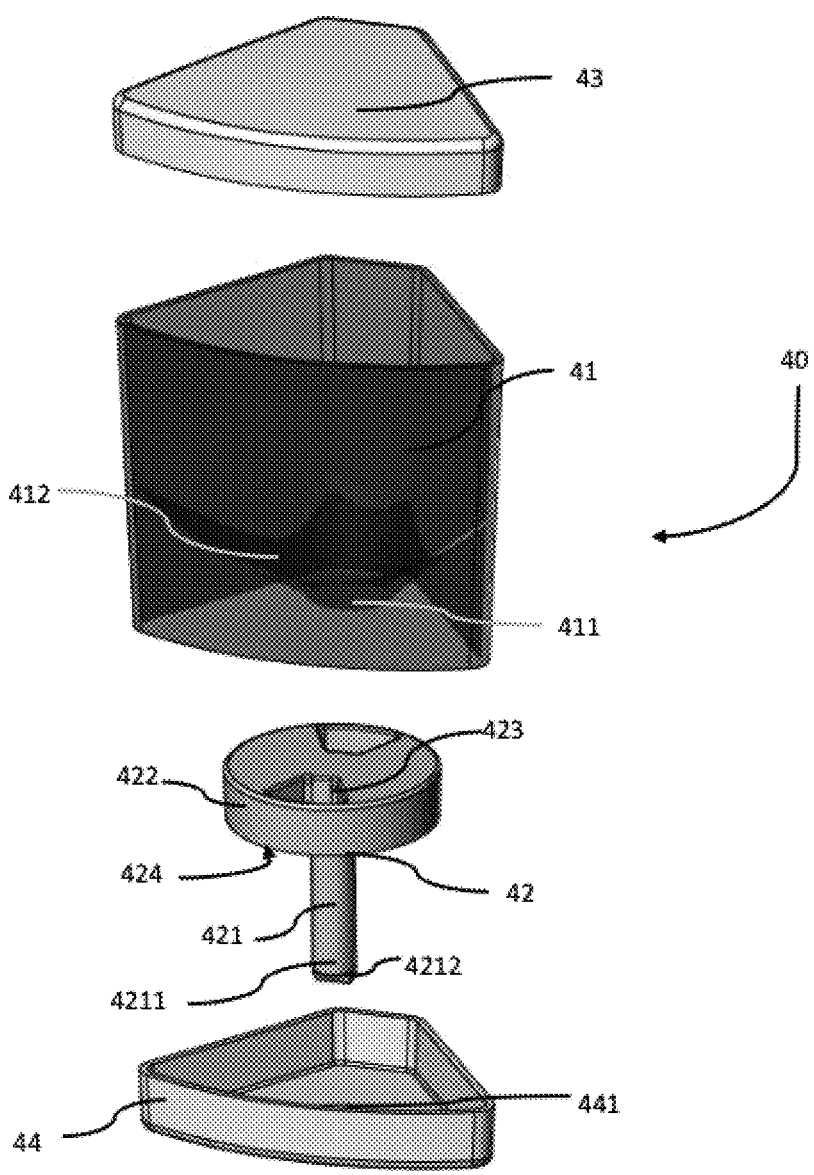
FIG. 9 is an exploded view of the food dispenser of the pet treat and toy dispenser shown in FIG. 1.

As shown on FIGS. 7A-B and 9, the food dispenser 40 further comprises a rotating distributor 42. The rotating distributor 42 comprises a shaft 421 and a cylindrical body 422 that comprises two distribution rooms 60 having treat apertures 423. The distribution rooms 60 are located at a 180-degree angle from each other. The rotating distributor 42 is placed under the food container 41 and on the top of the container support 44.

As shown on FIGS. 2 and 7A-B, when the food dispenser 40 is mounted in the food compartment 15, a part of the bottom surface 424 of the cylindrical body 422 is in contact with the top surface of the container support 44, and the shaft 421 goes through the rotation aperture 441 and then in the cylindrical aperture 161 of the elevated portion 16 to create a pivot linkage between the rotating distributor 42 and the carousel 10.

According to an embodiment, the size of the treat apertures 423 and the distributing aperture 442 of the container support 44 are similar. When the rotating distributor 42 is static (not moving) in its default position, one of the treat apertures 423 is aligned under the aperture 411 of the food container 41 and the other one of the treat apertures 423 is aligned and above the distributing aperture 442 of the container support 44.

The distribution of the treats (normally, one at a time) is done through a half-cycle rotation of the rotating distributor 42. When one of the treat apertures 423 of the rotating distributor 42 is aligned under the aperture 411 of the food container 41, the treat aperture 423 is in a filling position, allowing the food treat to fall through the apertures 411 and in the treat aperture 423 while being stopped by the container support 44. Hence the treat does not fall through and stays in the distribution room 60.

To distribute the treat comprised in the treat aperture 423, the rotating distributor 42 does a 180-degree rotation that brings the treat aperture 423 in a distributing position. In the distributing position, the treat aperture 423 of the rotating distributor 42 is aligned with the distributing aperture 442 of the container support 44, allowing the food treat to fall into the trough portion 17 and in consequence to be available for the pet.

According to an embodiment and as shown on FIGS. 7A-B and 9, the bottom end 4211 of the shaft 421 has been machined to have a rectangular tenon 4212. When the food compartment is in front of the cap opening 23, the rotating distributor 42 is on top of the feeder transmission shaft 37. The rectangular tenon 4212 of the bottom end 4211 of the shaft 421 of the rotating distributor 42 are configured to be inserted in the horizontal groove 373 of the feeder transmission shaft 37. When in this position, the rotation of the feeder motor 36 drives the rotating distributor 42.

According to an embodiment, the rectangular tenon 4212 of the bottom end 4211 of the rotating distributor 42 returns, when the feeder motor 36 stops, to a default position perpendicular to the axis 55. This default position corresponds to the treat apertures 423 being in the "filling position" and the other is in the "distributing position". This default position also corresponds in the rectangular tenon 4212 being tangentially positioned relative to the axis 55. This position of the rectangular tenon 4212 allows free movement of the rotating distributor 42 away from the feeder transmission shaft 37, aka a releasable interface 58 that allows the carousel 10 to rotate and thus uncouple the food dispenser 40 from the feeder motor 36.

It is worth mentioning that the container cap 43 is configured to be unclipped easily to add food in the food container 41.

According to an embodiment, the food dispenser 40 can be easily removed by pulling it upwardly. Since the food dispenser 40 is simply laid onto the elevated portion 16 with the shaft 421 coupled releasably to the feeder transmission shaft 37 through an upward displacement of the food dispenser 40, it is easy to remove and to remount. This makes the maintenance simpler and facilitates the cleaning of the food dispenser parts.

According to an embodiment, each toy compartment can contain more than one toy.

According to an embodiment, the electronic interface 38 allows the user to program distribution cycles. The user can therefore set up times at which a toy is distributed, aka made available, or a food treat is dispensed.

According to an embodiment, the pet treat and toy distributor 100 allows positive and motivational reinforcement via these distribution cycles. Indeed, the system distributes a toy to the pet and distributes a food treat after a certain period during which the pet is free to play with the toy, making the pet treat and toy distributor 100 self-sufficient to distract the pet and allowing the two kinds of treats not to compete against each other.

According to an embodiment and as shown on FIGS. 8A-B, when the skate assembly 18 is placed between the pair of position sensors 383 (from FIGS. 4 and 5), the carousel 10 is oriented to have the food compartment 15 in front of the cap opening 23.

According to an embodiment, the default orientation of the carousel 10 places the food compartment aligned with the cap opening 23. Therefore, the default orientation of the carousel 10 is achieved when the skate assembly 18 is between the pair of position sensors 383.

In a preferred mode of operation, between two treat distribution phases in which the carousel gives access to a compartment 11 holding a toy, the carousel 10 returns to the default orientation in which the food compartment 15 is aligned with the cap opening 23. The rotation base 33 has thus a default orientation, as the rotation base 33 is linked with the carousel 10.

Not shown. According to another embodiment, the pet treat and toy distributor 100 may comprise more than one food compartment 15, and thus a plurality of compartments configured to hold a food dispenser 40. Accordingly, the pet treat and toy distributor 100 may be configured to provide more than one type of food treat or may be configured with a greater reserve of food treats.

According to an embodiment, one or more of the cap 20, the carousel 10, the top base 31 and the bottom base 32 are made of plastic or polymer material. They can be manufactured through injection molding. In the same way, one or more of the food container 41, the container cap 43 and the container support 44 are made of plastic or polymer material.

According to an embodiment, one or more of the multiple gears, worm wheels and worms, axle and shaft are made of plastics or polymer material. One or more of these parts can also be made of steel or aluminum materials to increase their strength, which typically also increase the weight and/or the price of production.

According to an embodiment, the pet treat and toy distributor 100 is powered by a battery (not shown). According to another embodiment, the pet treat and toy distributor 100 is powered from an electrical outlet.

According to an embodiment, program data is stored in memory maintain data when out of power, or comprises a second power source (auxiliary battery) for maintaining program data when the main power source is depleted or out.

According to an embodiment, a speaker 325 is mounted to the bottom base 32. The speaker 325 is connected to the PCB 66 and configured to emit sound or music in direction of the floor. The sound or music emitted by the pet treat and toy distributor 100 may be programmed to be associated with operations, and/or used to draw the pet's attention.

According to an embodiment, the pet treat and toy distributor 100 is configured to be wirelessly connected to a network and to be controllable by an app on a smart device. The pet treat and toy distributor 100 can also be connected to other smart devices to allow a more global monitoring of the pet. For example, another smart device may be configured to detect a doorbell ring and barking for a given period after the doorbell ring. A behavior of no barking could thus be detected and rewarded with distribution of a treat by the pet treat and toy distributor 100.

According to an embodiment, the pet treat and toy distributor 100 is used according to a method, for example the method described below (assuming the pet treat and toy distributor 100 is powered by a battery).

Step 1: Removing the cap 20 from the pet treat and toy distributor 100.

Step 2: Placing toys in the compartments 11.

Step 3: Removing container cap 43 from the food dispenser 40 and place treats in food container 41. Replacing container cap 43 on the food dispenser 40.

Step 4: Programming the times at which the food and toys are to be distributed using the electronic interface 38.

Step 5: Replacing the cap 20 on the pet treat and toy distributor 100.

Step 6: Placing the pet treat and toy distributor 100 in its designated place such that it is accessible to the pet.

Accordingly, the pet treat and toy distributor 100 would operate as programmed to distribute inserted treats in a preset order according to the programming.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A distributor to distribute a treat among toys and food treats to a pet, the distributor comprising:
    a base assembly;
    a carousel pivotably mounted to the base assembly, the carousel comprising partitions defining at least a first compartment;
    a cap configured to be mounted to the base assembly and to cover the carousel, the cap comprising an opening that, when aligned with the first compartment, provides access to the first compartment;
    a food dispenser configured to be mounted to the first compartment;
    a feeder motor configured to drive the food dispenser; and
    driving means for driving the carousel to rotate between
        a first orientation wherein the first compartment is not aligned with the opening, and
        a second orientation wherein the first compartment is aligned with the opening,
    wherein in the second orientation the treat is accessible to the pet,
    wherein the first compartment comprises a slope portion extending between an elevated portion and a trough portion, wherein the food dispenser is configured to be mounted to the elevated portion and to extend beyond the elevated portion about the slope portion,
    wherein the elevated portion comprises and aperture, and the food dispenser comprises a shaft configured to extend through the aperture when mounted to the first compartment, wherein the distributor further comprises a feeder driving assembly couple to the feeder motor, wherein the shaft is configured to be coupled releasably to the feeder driving assembly.

2. The distributor of claim 1, wherein the driving means is a motor housed in the base assembly.

3. The distributor of claim 1, further comprising a cap driving assembly coupling the driving means to the cap.

4. The distributor of claim 3, wherein the cap driving assembly comprises a rotation base pivotally mounted to the base assembly, the rotation base comprising a cap driving interface configured to be coupled to the cap.

5. The distributor of claim 4, wherein the cap driving interface comprises at least one groove.

6. The distributor of claim 5, wherein the cap driving interface is configured to rotate about an axis, and wherein the at least one groove is unevenly distributed around the axis.

7. The distributor of claim 1, wherein the feeder driving assembly and the shaft are coupled along a feeder driving interface, the feeder driving interface comprising a tenon and a groove.

8. The distributor of claim 7, wherein feeder driving interface is shaped to disengage the shaft from the feeder driving assembly when the carousel rotates.

9. The distributor of claim 1, wherein the food dispenser comprises a food container controllably coupled to a distribution room, wherein the shaft is configured to rotate between a filling position and a distributing position, with driving the shaft in the filling position aligns the food container with the distribution room.

10. The distributor of claim 9, wherein the distribution room is distal from the shaft, with driving the shaft in the distributing position sets the distribution room above one of the slope portion and the trough portion.

11. The distributor of claim 1, further comprising a Printed Control Board coupled to the driving means, the Printed Control Board being configured to control operation of the driving means.

12. The distributor of claim 11, further comprising a screen and at least one control button coupled to the Printed Control Board, wherein the base assembly comprises base apertures providing access to the screen and the at least one control button.

13. The distributor of claim 12, wherein the cap comprises a cap aperture and a cover portion, wherein the cap aperture provides access to the screen and the cover portion prevents access to the at least one control button when the cap is mounted to the base assembly.

14. The distributor of claim 11, wherein the carousel comprises a skate assembly, and the distributor comprises a sensor coupled to the Printed Control Board, wherein the sensor is configured to detect the skate assembly when traveling in proximity thereof, thereby detecting orientation of the carousel.

15. The distributor of claim 1, further comprising at least a second compartment, wherein rotation of the carousel in the first orientation causes the second compartment to align with the opening.

16. The distributor of claim 1, wherein the base assembly and the cap have a non-cylindrical interface through which the cap is mounted to the base assembly, the non-cylindrical interface preventing rotation of the cap relative to the base assembly.

17. A distributor to distribute a treat to a pet, the distributor comprising:

a base assembly;

a carousel pivotably mounted to the base assembly, the carousel comprising partitions defining at least a first compartment;

a cap configured to be mounted to the base assembly and to cover the carouses, the cap comprising an opening that, when aligned with the first compartment, provides access to the first compartment;

a carousel driving assembly for driving the carousel to rotate between a first orientation wherein the first compartment is not aligned with the opening, and a second orientation wherein the first compartment is aligned with the opening, wherein in the second orientation the treat is accessible to the pet;

a feeder motor; and a food dispenser configured to be mounted to the first compartment, the food dispenser comprising a shaft configured to be coupled releasably to the feeder motor.

18. The distributor of claim 17, wherein the shaft is configured to be coupled releasably to the feeder motor through a releasable coupling of a tenon in a groove.

19. A distributor to distribute a treat to a pet, the distributor comprising:

a base assembly;

a carousel pivotably mounted to the base assembly, the carousel comprising partitions defining at least a first compartment;

a cap configured to be mounted to the base assembly and to cover the carousel, the cap comprising an opening that, when aligned with the first compartment, provides access to the first compartment;

a carousel driving assembly for driving the carousel to rotate between a first orientation wherein the first compartment is not aligned with the opening, and a second orientation wherein the first compartment is aligned with the opening, wherein in the second orientation the treat is accessible to the pet;

a feeder motor mounted to the base assembly under the carousel;

a shaft driven by the feeder motor, configured to extend through the carousel; and a food dispenser configured to be mounted to the first compartment, the food dispenser being coupled releasably to the shaft.

20. The distributor of claim 19, wherein the food dispenser is configured to be coupled releasably to the shaft through a releasable coupling of a tenon in a groove.

* * * * *